(12) United States Patent
Badenes et al.

(10) Patent No.: US 8,914,368 B2
(45) Date of Patent: Dec. 16, 2014

(54) AUGMENTED AND CROSS-SERVICE TAGGING

(75) Inventors: Hernan Badenes, Neuquen (AR); Julian Ariel Cerruti, Buenos Aires (AR); Stephen Michael Dill, San Jose, CA (US); Julia Haven Grace, San Jose, CA (US); Nicolas Lanaro, Buenos Aires (AR); Jerald Thomas Schoudt, Douglassville, PA (US); John C Tang, Palo Alto, CA (US); Eric Wilcox, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 12/752,016

(22) Filed: Mar. 31, 2010

(65) Prior Publication Data
US 2011/0246482 A1    Oct. 6, 2011

(51) Int. Cl.
G06F 17/30    (2006.01)
G06F 7/00    (2006.01)

(52) U.S. Cl.
CPC .... *G06F 17/30876* (2013.01); *G06F 17/30734* (2013.01); *G06F 17/30731* (2013.01); *G06F 17/30011* (2013.01); *G06F 17/30896* (2013.01)
USPC .......................................................... 707/737

(58) Field of Classification Search
CPC ..................... G06F 17/30731; G06F 17/30734
USPC .................................. 707/603, 748, 737, 739
See application file for complete search history.

(56) References Cited

U.S. PATENT DOCUMENTS

| | | | |
|---|---|---|---|
| 7,454,414 B2 * | 11/2008 | Schirmer et al. | 1/1 |
| 7,478,105 B2 * | 1/2009 | Albornoz et al. | 1/1 |
| 7,502,785 B2 | 3/2009 | Chen et al. | |
| 8,156,154 B2 * | 4/2012 | Taranov et al. | 707/802 |
| 8,468,447 B2 * | 6/2013 | Drieschner | 715/243 |
| 2005/0198153 A1 | 9/2005 | Keohane et al. | |
| 2005/0267864 A1 | 12/2005 | Pope et al. | |

(Continued)

OTHER PUBLICATIONS

Ying Ding, Elin Jacob, Michael Fried, Ioan Toma, Erjia Yan, schubert Foo and Stasa Milojevic, Upper Tag Ontology for Integrating Social Tagging Data, Journal of American Society for Information Science and Technology, vol. 61, Issue 3, pp. 505-521, published Dec. 2009.*

(Continued)

*Primary Examiner* — Jeffrey A Burke
(74) *Attorney, Agent, or Firm* — Cantor Colburn LLP; Libby Toub

(57) ABSTRACT

According to one embodiment of the present invention, a method for cross-service tagging is provided. The method includes creating connections to multiple applications, each application having multiple entities. Relationships are determined between the entities within a single application and between entities across multiple applications. A tag is associated with a selected one of the entities in a first one of the multiple applications. Entities in other applications besides the first application are identified that are related to the selected entity, based on the determined relationships. The tag is propagated across multiple applications by associating the tag with the identified entities in the other applications. According to a second embodiment of the present invention, a method for inferring tags suggestions is provided. This method includes analyzing email messages to create keywords from text analysis, from bringing content and tags from other email messages or directory applications. Tags suggestions from the various sources are merged and weighed according to an algorithm.

22 Claims, 7 Drawing Sheets

(56) References Cited

U.S. PATENT DOCUMENTS

| | | |
|---|---|---|
| 2006/0095521 A1 | 5/2006 | Patinkin |
| 2007/0016575 A1* | 1/2007 | Hurst-Hiller et al. ............. 707/5 |
| 2007/0150487 A1* | 6/2007 | Christian et al. ............. 707/100 |
| 2007/0174247 A1* | 7/2007 | Xu et al. ............................ 707/3 |
| 2008/0040126 A1 | 2/2008 | Estrada et al. |
| 2008/0104032 A1 | 5/2008 | Sarkar |
| 2008/0228749 A1* | 9/2008 | Brown .............................. 707/5 |
| 2008/0276177 A1* | 11/2008 | Sauve ........................... 715/733 |
| 2008/0282198 A1* | 11/2008 | Brooks et al. ................. 715/854 |
| 2009/0006285 A1* | 1/2009 | Meek et al. ..................... 706/12 |
| 2009/0043789 A1* | 2/2009 | Gupta ........................... 707/100 |
| 2009/0077062 A1 | 3/2009 | Spivack et al. |
| 2009/0106307 A1* | 4/2009 | Spivack ................... 707/103 R |
| 2009/0119572 A1* | 5/2009 | Koivunen ..................... 715/206 |
| 2009/0119608 A1 | 5/2009 | Huskey |
| 2009/0132528 A1 | 5/2009 | Albornoz et al. |
| 2009/0164634 A1* | 6/2009 | Brooks et al. ................. 709/226 |
| 2009/0287679 A1* | 11/2009 | Jin et al. ............................. 707/5 |
| 2010/0010982 A1* | 1/2010 | Broder et al. ..................... 707/5 |
| 2010/0017419 A1* | 1/2010 | Francis et al. ................. 707/100 |
| 2010/0064231 A1* | 3/2010 | Gupta ........................... 715/748 |
| 2010/0070851 A1* | 3/2010 | Chen et al. .................... 715/236 |
| 2010/0211535 A1* | 8/2010 | Rosenberger ................... 706/20 |
| 2010/0223261 A1* | 9/2010 | Sarkar ........................... 707/726 |

OTHER PUBLICATIONS

Mark Dredze, Hanna Wallach, Danny Puller, Tova Brooks, Josh Carroll, Joshua Magarick, John Blitzer, Fernando Pereira, "Intelligent Email: Aiding Users with AI," National Conference on Artificial Intelligence (AAAI), Nectar Paper, 2008.

Fabian Abel, Nicola Henze, Daniel Krause, "Group Me! Where Information Meets," WWW2008, Poster Paper, Apr. 2008, Beijing, China.

Morgan Ames, Mor Naaman, "Why We Tag: Motivations for Annotation in Mobile Online Media," CHI 2007, pp. 971-980, San Jose, CA.

Scott A. Golder, Bernanardo A. Huberman, "Use patterns of collaborative tagging systems," Journal of Information Science, 2006, pp. 198-208, vol. 32, No. 2.

Yin et al., "Exploring Social Tagging Graph for Web Object Classification" KDD '09, Jun. 28, 2009, Paris, France, pp. 957-965.

* cited by examiner

AUGMENTED AND CROSS-SERVICE TAGGING

BACKGROUND

The present invention relates to social tagging, and more specifically, to techniques for automatically generating and propagating tags in web 2.0 social networks and applications.

Managing the increasing volume of information available from various sources has become a challenging task for computer users. The adoption of Web 2.0 social networks and applications, where many users can create content, has increased this challenge. Over time, social tagging has developed as a non-centralized alternative to organizing and giving semantics to content and as a way of sharing organizational structure among all users of various applications. Using tags, users apply keywords to elements in the application, which serve to relate these elements to others sharing the same subject.

Social tagging serves a useful purpose because no single user would be able to manage the number of elements that normally populate a social application. Instead, every user visiting a web page or viewing a document has the chance to apply a tag, thus helping him and other users to search for it. This distributed intelligence is much more efficient than tagging by a single user. Examples of applications with social tagging include del.icio.us (social bookmarking); blogger.com (blogs), and virtually any current web 2.0, socially-oriented application.

The benefits of social tagging depend on the existence of a large enough user population that is inclined to perform the tagging effort, and also depend on there being enough tags to converge on a meaningful and stable set of tags. It has been estimated that it takes about 100 tags to reach a meaningful and stable set of tags.

Helping users manage the information available in email is also a growing challenge. For each message, a user must decide how to best categorize, mark, label, or remove important messages from the rest of the message to best facilitate later retrieval. Managing information in email currently primarily relies on manually filing messages into folders. Tagging has a benefit over folders in that a user can apply multiple tags to a single message without the message moving out of view, as is common in folders. Systems like Taglocity provide social tagging of email messages. When a user applies and shares the tag applied to a message, the recipient of the e-mail automatically gets the benefit of the tag applied by the former user into the message that was just received.

SUMMARY

According to one embodiment of the present invention, a method comprises: creating connections to multiple applications, each application having multiple entities; determining relationships between the entities within a single application and between entities across multiple applications; associating a tag with a selected one of the entities in a first one of the multiple applications; identifying entities in other applications besides the first application that are related to the selected entity, based on the determined relationships; and propagating the tag across multiple applications by associating the tag with the identified entities in the other applications.

According to another embodiment of the present invention, a system comprises: a plurality of applications; a cross-service tagging mashup application connected to the plurality of applications; a relationship discovery component for discovering relationships between entities within individual applications and between entities across multiple applications; a tag initiation component for initiating tags; and a tag propagation component for propagating tags across multiple applications based on relationships discovered by the relationship discovery component.

According to a further embodiment of the present invention, a method comprises: receiving a new email message sent to a user using an email application; comparing the new email message with previous emails sent to said user; generating a keyword set of related words, including words found in both the new and previous email messages; and presenting the keyword set to said user.

According to another embodiment of the present invention, a computer program product for cross-service tagging comprises: a computer usable medium having computer usable program code embodied therewith, the computer usable program code comprising: computer usable program code configured to: create connections to multiple applications, each application having multiple entities; determine relationships between the entities within a single application and between entities across multiple applications; associate a tag with a selected one of the entities in a first one of the multiple applications; identify entities in other applications besides the first application that are related to the selected entity, based on the determined relationships; and propagate the tag across multiple applications by associating the tag with the identified entities in the other applications.

DETAILED DESCRIPTION

Figure 1:
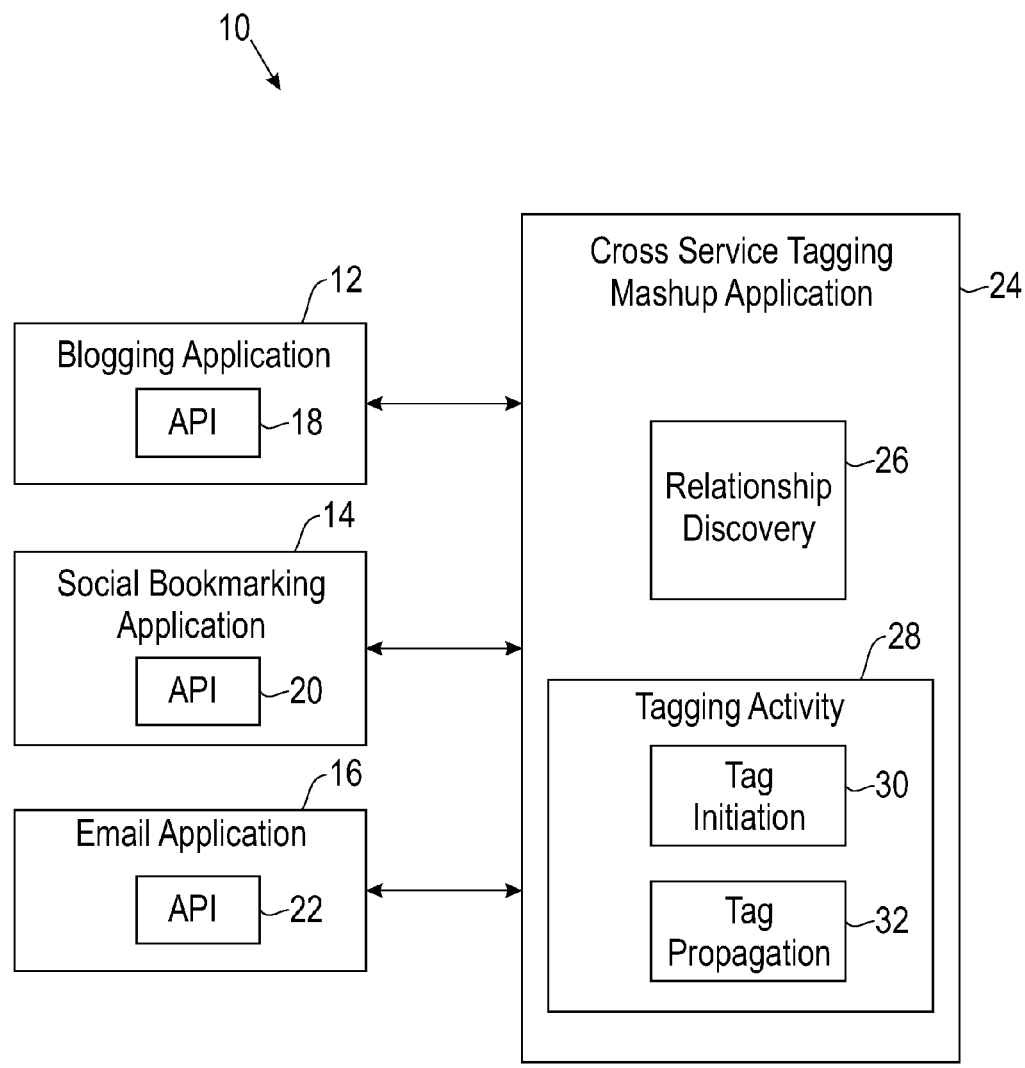
FIG. 1 shows a diagram of a system for cross-service tagging in accordance with an embodiment of the invention.

Embodiments of the invention provide ways to automatically propagate user-applied tags from one application to another across related entities belonging to different services, where relationships are discovered by the application itself.

As described above, social tagging has a number of advantages. However, there is a common problem in current social network technologies. In particular, though content can be related across these applications, and indeed mashups can be implemented to share content from one application to other, the added value of tags is not normally shared across applications: the semantics given by the classification applied by users must be repeated in each application.

For example, consider the social bookmarking application "del.icio.us" and the blogging application "Blogger.com".

Different users can independently post a bookmark pointing to a URL in de.licio.us, and publish a blog post announcing the discovery of an interesting URL in Blogger.com—the same link as posted in de.licio.us. Note that these two elements, the blog post and the bookmark, are obviously related, though they have no connection and thus represent two unrelated elements: not only are they of different nature and belong to different applications, but they lack semantics to help determine that they in fact represent the same thing (or a closely related one). If a user applied a tag on one of the two elements the other is not normally altered. Embodiments of the present invention leverage the user action of giving semantics to one element (tagging) in one application by making that connection available in other applications.

A related idea was developed in GroupMe!, (Abel, Henze & Kraus, "GroupMe! Where Information Meets", poster paper in WWW2008, April 2008, China—http://www2008.org/papers/pdf/p1147-abelA.pdf). In GroupMe!, a user manually groups entities, belonging—to the user criteria—to related topics. The user can then apply tags to the group, and these tags get propagated to the entities it contains in their respective applications. Embodiments of the present invention differ from this work in part in that the grouping context provided does not need to be manually created. Instead, with embodiments of the invention, tags propagate to related systems via implicit relationships as bound by an email message, email thread, activity tree, or other set of structured information.

In some embodiments of the invention, a mechanism is created to aggregate tags from different social applications and merge the resulting set around related email messages. Additional embodiments of the invention expand this concept to: (a) function not only within email, but also in any other application where a mashup from other sources can exist; and (b) not only aggregate tags from other applications but also to propagate tags to other applications.

In general, embodiments of the invention extend application mashups to automatically propagate user-applied tags from one application to another across related entities belonging to different services, where relationships are discovered by the application itself. Usually applications provide an application programming interface (API) allowing outside applications to retrieve and update content. These APIs serve as a means to building a mashup. For any existing mashup allowing multiple applications to request content from or data sources through their APIs, embodiments of the invention allow tags to be sent (propagated) through the same APIs when an association exists between any two or more elements across applications.

One example that may be used to illustrate the invention is the situation of a blog post on blogger.com with links (URLs) to a few external websites. These URLs may have been bookmarked in del.icio.us, and may or may not, have tags on these bookmarks. Using embodiments of the invention, when a user applies a tag on the blog post, the blog application can apply these tags to the del.icio.us bookmarks.

Another example happens when a user receives an email with a URL in BlueMail (http://bluemail.almaden.ibm.com). BlueMail offers the ability to tag messages for easier organization and later retrieval, and indeed allows tags to propagate from a dogear bookmark if it exists. Using embodiments of the invention, when the user tags this email, the email client (or server) can propagate the tag to the dogear bookmark on that URL.

Furthermore, using embodiments of the invention, user tags can propagate through different services transparently to the user. These user-applied tags, which create "folksonomies" and add semantics to massively accessible items, would then propagate more broadly, thus enriching more content on more services than if a user had to manually select and apply tags to those entities.

The details of the implementation will vary accordingly to each mashup and the APIs used. While particular examples are described herein, it will be appreciated that the concepts illustrated herein can be implemented on virtually any mashup.

Various embodiments of the invention use the following elements:

An application mashup bringing content from more than one source. For example, this may be an email client that interacts with blogging and social bookmarking applications.

A way to discover and establish relationships among objects from those applications, which is described below in more detail. For example, from an email message with a URL a relationship can be established to the bookmark element in a social bookmarking application.

The action of tagging one of the elements in the application. In some embodiments this may be done by a user, who applies a tag to help organize the contents he usually accesses, although other techniques are possible.

With the above three elements present, the mashup application will not only apply the tag(s) on the selected entity (in the previous example, on the email message the user is explicitly tagging) but it will also propagate the tag to the other services in the mashup through their APIs.

FIG. 1 shows a diagram of a system 10 for cross-service tagging in accordance with an embodiment of the invention. In this system 10, existing applications may include one or more blogging applications 12, social bookmarking applications 14, and email applications 16. Each of the applications includes an application programming interface (API) 18, 20 and 22 respectively. A cross-service tagging mashup application 24 includes a relationship discovery unit 26, and a tagging activity unit 28. The tagging activity unit 28 includes a tag initiation unit 30 and a tag propagation unit 32.

As mentioned above, the details for accessing each service will vary depending on each particular API. Also, how to get a service's contents and how to propagate tags will vary depending on each particular API.

How to establish relationships between the entities belonging to different applications, so that tags can be shared or propagated, will now be described. There can be several ways to do this. One way is URL matching. Whenever two entities point to the same URL there is clear connection between them. The URLs don't even need to be exact, but they can point to similar locations in the same server for instance. For example, the following might be considered as the same URL in terms of creating entities' relationships:

www.myserver.com/news/november/tagging.html#footer
www.myserver.com/news/november/
   tagging.html?printable=true
www.myserver.com/news/november/

Text analysis is another way to establish relationships between entities belonging to different applicants so that tags can be shared or propagated. This may include tools like text-classifying algorithms that can be used to capture "similarity" among entities, regardless of whether they are the same class of elements or not (for example, comparing email messages' text to blog posts' contents). If they are found similar enough so as to be considered that they refer to the same objects or entities, then a relationship through which tags are propagated can be established.

Figure 2:
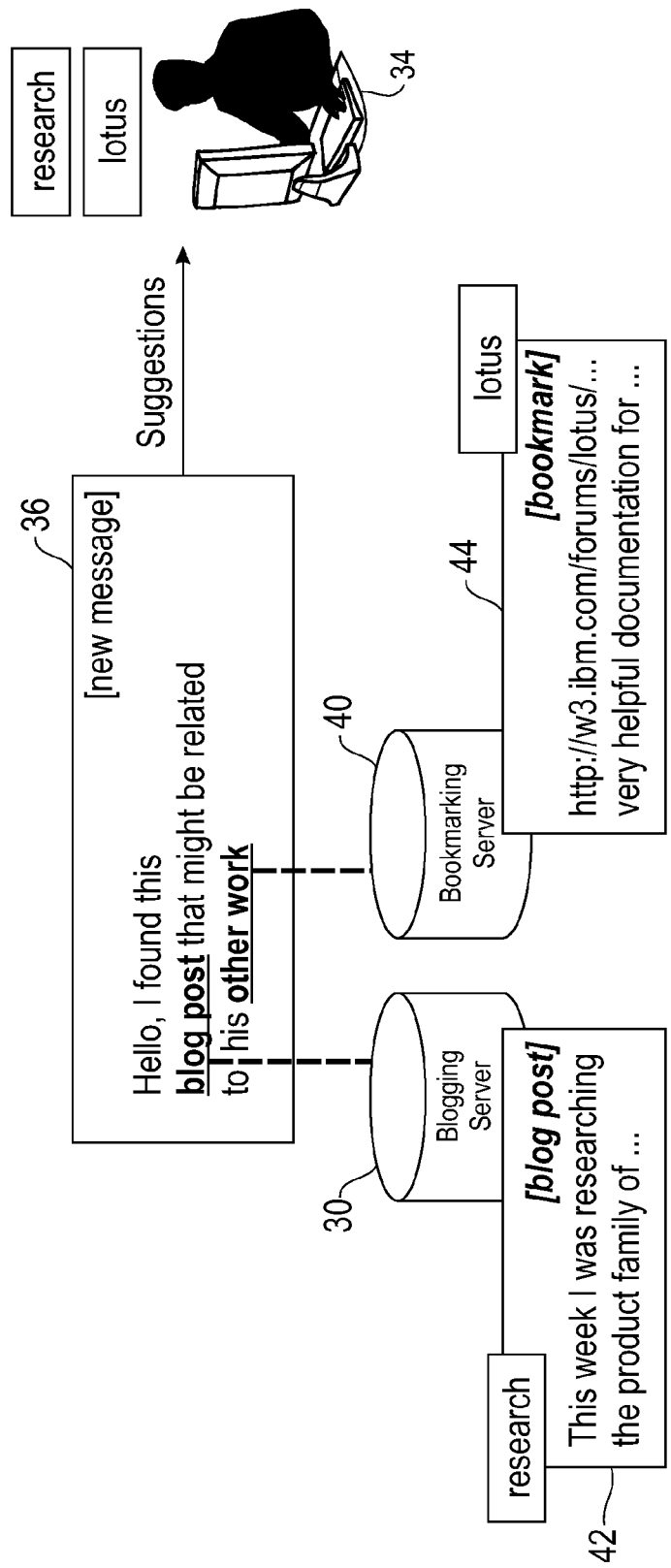
FIG. 2 shows a diagram of an example of pulling tags from different applications into email messages in accordance to an embodiment of the invention.

In one example, tags may be pulled into email messages. Referring now to FIG. 2, there is shown a diagram of an example of pulling tags into email messages in accordance with an embodiment of the invention. A user 34 receives and is reading an email message 36, the email program queries for content related to the message on the related blogging 30 and bookmarking 40 (such as del.icio.us) applications. It is found that other users previously tagged a related blog post 42 as "research", and a related bookmark 44 as "lotus". The user 34 may then be presented the two tags "lotus" and "research" as suggestions for the incoming email message 36, or have these tags automatically applied by the system.

Figure 3:
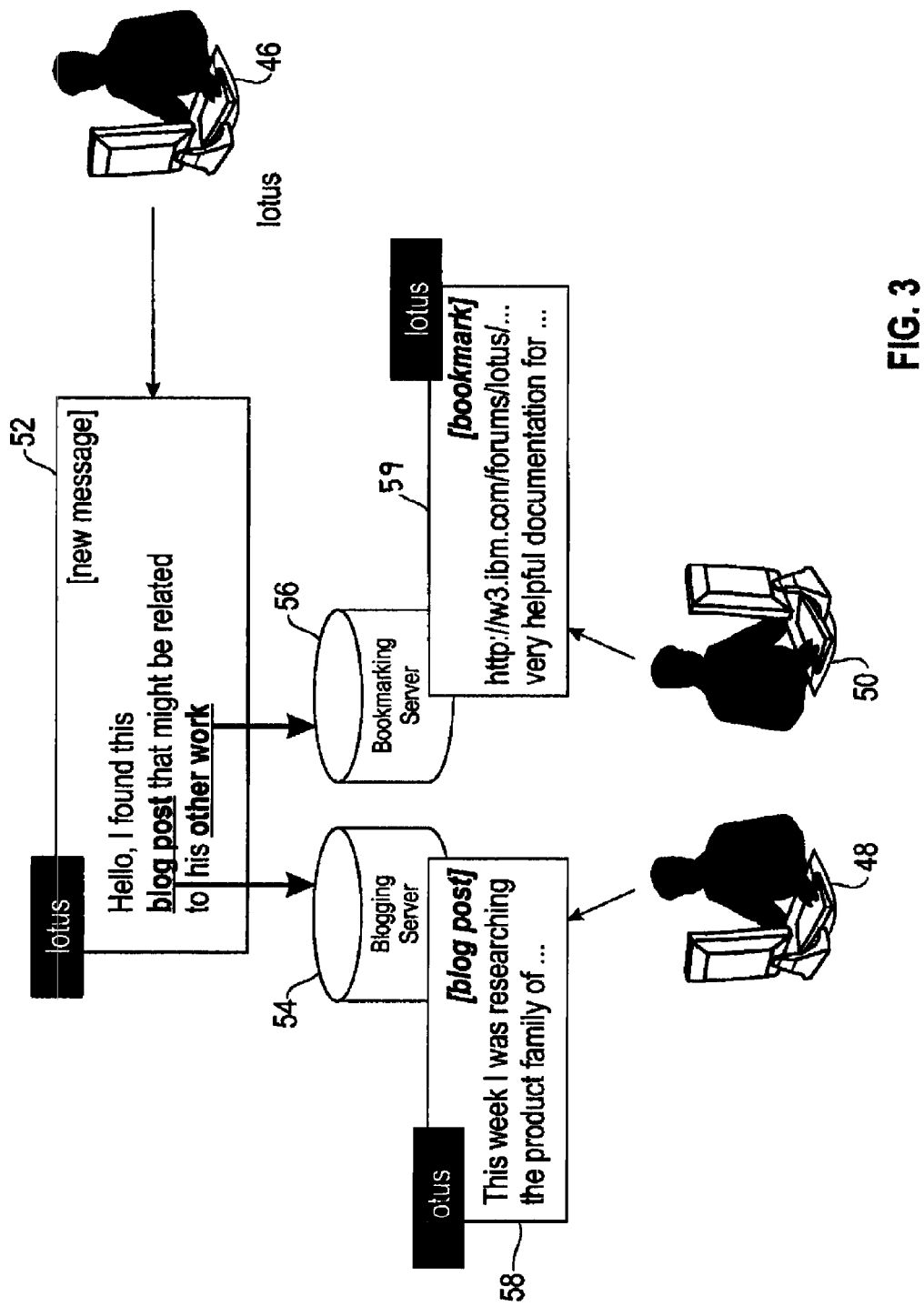
FIG. 3 shows a diagram of an example of pushing tags from email messages in accordance with an embodiment of the invention.

FIG. 3 shows a diagram of an example of pushing tags into email messages in accordance with an embodiment of the invention. If the user 46 categorizes his/her message 52, at the same time the email program propagates this tag to other elements (which are public) and may include a blogging server 54 and a bookmarking server 56, such as a del.icio.us server. In this example a tag for blog post 58 and a social bookmark 59 are automatically generated. Then, in one action several different entities, available to different users, have been enriched with semantics given by a single user. Users 48 and 50 reading content on the bookmarking or blogging application may then see the tag applied to the email message 52 even when they have no access to it. Similarly, tags may also be from social bookmarks. The blogging application 54 may discover the relationship between the URL bookmarked and a blog post mentioning the same URL. Then, at the time a del.icio.us user 50 tags this bookmark, the del.icio.us server 56 can automatically propagate the tag to the blog post 58 in the blogging server 54.

Figure 4:
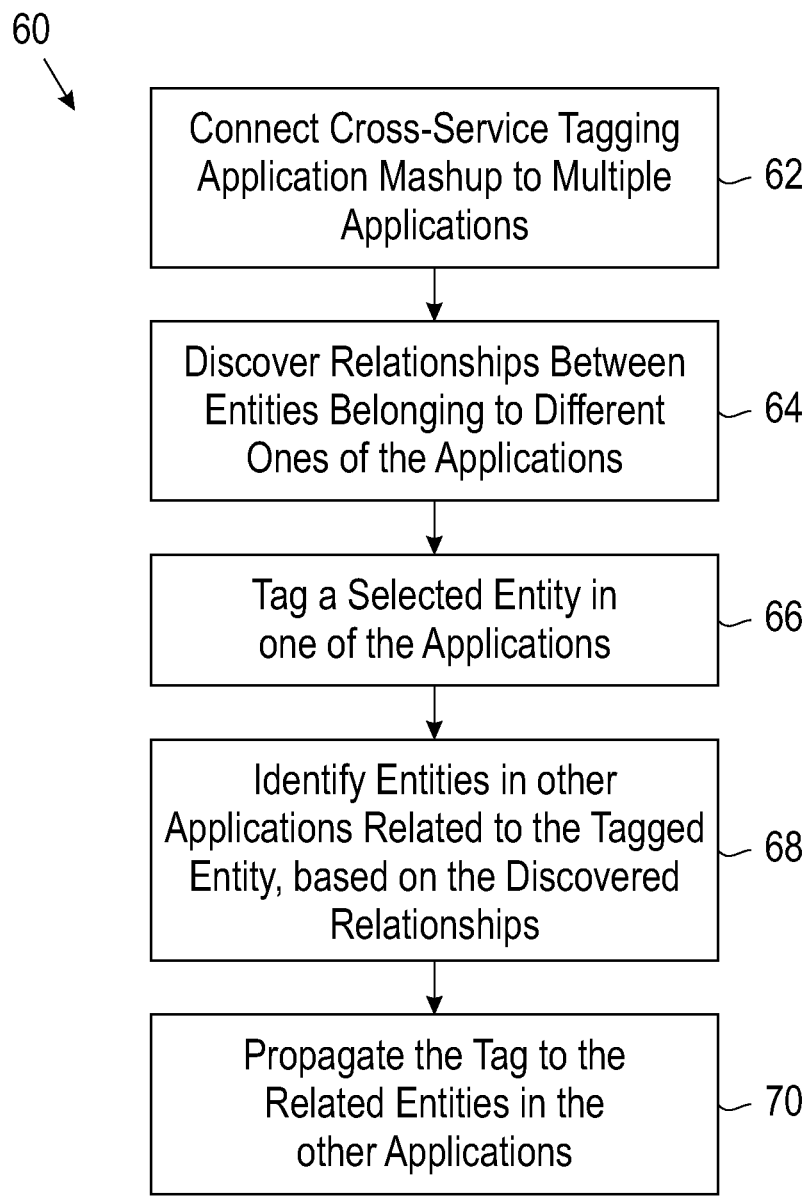
FIG. 4 shows a flowchart of a method for cross-service tagging in accordance with an embodiment of the invention.

FIG. 4 shows a flowchart of a method 60 for cross-service tagging in accordance with an embodiment of the invention. In step 62, the cross-service tagging mashup application is connected to multiple applications. Relationships are then discovered between entities belonging to different one of the applications, in step 64. In step 66, a selected entity in one of the applications is then tagged. In step 68, entities in other applications related to the tagged entity are identified based on the discovered relationships. The tag may then be propagated to the related entities in the other applications, in step 70.

Embodiments of the invention directed to email applications pose special issues. For example, email messages are not universally shared with the public at large, unlike the popular web sites that feature tagging. Thus, to make tagging effective in the email context, is would be desirable to provide a way to easily apply tags to email messages within the much more limited number of users among which email is shared.

Embodiments of the invention may combine several different mechanisms for suggesting or automatically applying tags to email messages to help organize email for later search and retrieval. By making it easier and more efficient to associate tags with email messages, the use of tagging within email will be encouraged, enabling the user to enjoy its benefits. Embodiments of the invention may integrate several different approaches for associating tags with messages including one of the following (or combinations thereof):

leveraging prior tagging or indexing work on related messages exploiting others' tagging work on shared or related messages integrating analysis of the content of email messages to suggest meaningful tags for the message leveraging tags from other sources on components of the message (such as the sender or pointers to web pages included in the message)

It will be appreciated that these concepts could be applied to applications besides email, such as any application that includes sharing information with a subset of users, such as shared document repositories or wikis.

Embodiments of the invention may combine several different mechanisms for suggesting or automatically applying tags to email messages. Fundamentally, these embodiments encourage more usage of tagging by making it easier and more efficient to associate tags with email messages. There at least three ways to make it easier to apply tags to email messages:

Automatically apply tags to email messages, thus obviating the need for any additional user effort. This approach makes the most sense when there is high confidence of the applicability of the tag to a message.

Suggesting or recommending tags for email messages, thus reducing the effort to apply the tag to the message to a single click or comparable lightweight user interaction. This approach presents the most salient tags to the user, but relies on the user to confirm applying the tag(s) to the message.

Applying a latent tag, so that the system associates a tag with an email message such that the tag can be useful in search, sort, or other information management techniques, but is not exposed to the user to avoid cluttering up the user interface. This approach can attach tags that could be useful in programmatic techniques for finding or sorting messages without burdening the user with more clutter or visual representation of the tags.

The goal of all of these approaches is to increase the number of meaningful tags applied to email messages, thereby increasing the scope of benefits enabled by tagging, while requiring a minimal amount of extra effort from the user to apply the tags.

An important aspect of some embodiments of the invention is to suggest or automatically apply relevant and useful tags to email messages. To do this, embodiments of the invention may use a combination of the above-described different approaches to help organize email for later search and retrieval.

One of these approaches is leveraging prior tagging. If the user has previously tagged an earlier message that is related to the current one, then that tag should be suggested or applied to the current message. A simple example illustrates this approach. If the user tags message A with a tag "foo", if message B arrives that is a reply to message A, then tag "foo" is also probably relevant to message B. As another example, if a user has already filed a message into a folder, it may also make sense to tag the message with a label related to the folder name to enable searching and sorting by tag as well as by folder name. In this approach, we are leveraging user effort that has already been applied to the email message to either suggest or automatically apply tags to messages.

Another approach is exploiting others' tagging work on shared or related messages. This approach leverages other recipients' tagging work on a message to be shared with any other recipient of the message. Thus, if message C is sent to 7 people, and the first recipient tags it as "ProjectA", then that tag could also be suggested to the other six recipients and the sender. This approach leverages the tagging work of any individual user to the others who are socially connected by sharing that message. This "social tagging" of email messages borrows directly from what happens in publicly shared Web 2.0 applications within the scope of email messages that are typically shared within a more limited scope of people.

Because sharing email messages is more limited, embodiments of the invention extend the scope of social tagging in email to make it more useful. For example, combining with the earlier approach of leveraging prior tagging, if message D is a reply to message C, then "ProjectA" could be offered as a tag to all the recipients of message D as a way of leveraging the effort of one person's tag of the related message C.

Another approach is integrating analysis of the content of email messages. A variety of methods (artificial intelligence, semantic data mining, etc.) have been used to identify keywords to represent the content of information. Examples of these methods include k-means or TF-IDF based text categorization, social-filtering, modified PageRank relation, latent semantic analysis, and neural network-based machine learning. These information clustering methods could also be used to suggest tags for email messages.

Another approach is leveraging tags from other sources on components of the message. As tagging has gained in popularity, more and more applications are offering tagging capabilities. For example, within IBM, Fringe allows employees to tag people with topics that are associated with those people. Del.icio.us allows tagging web page URLs with topics associated with the web page. Blogger.com allows blog postings to be tagged. By extension, URLs referenced in an e-mail might refer to a blog that is in turn tagged. Email is a very common communication channel that involves people and could be used to send pointers to web sites. Embodiments of the invention take advantage of the people and web pointers included in an email message and the tags associated with those artifacts to suggest that these tags might also be appropriate for the email message as well. In this way, embodiments of the invention take advantage of tags applied in other applications and use them to suggest tags for email, offering some integration of tagging across applications.

Perhaps the most flexibility and versatility comes from combining various approaches described above. For example, Artificial Intelligence (AI) techniques could identify that several threads of messages in an inbox share similar content. If a tag has been applied to any of those messages, the system could suggest that tag for any of the remaining messages. This combines leveraging prior tagging with analyzing the content of messages for similarity.

As another example, imagine person Alpha who has message E with tag "ProjectB" applied to it in her email store. At the same time, person Beta is about to read another message F. AI techniques could be used to identify that message E and message F are on a similar topic. Thus, by a combination of artificial intelligence techniques and social tagging, person Alpha's "ProjectB" tag on Message E will be suggested as a tag for message F to person Beta. In other words, suggesting tags other people have applied to similar messages, where similarity is given by some AI or semantic analysis algorithm.

At a more aggregated social level, applying artificial intelligence techniques to analyze a large body of tagged email data from a large number of people in the enterprise (perhaps scoped by business unit or job role) could identify relationships between specific tags and semantic concepts expressed in the text. Having arrived at this knowledge through analyzing data in the aggregate, the system could suggest a specific tag when it recognizes the semantic context in any email that is analyzed. This combination leverages social knowledge encoded in previous tagging behavior in the aggregate in a way that benefits individual users without actually having to share specific messages, but through shared semantic content from related messages.

Using all of the methods above may generate many ways of augmenting tagging on a message beyond what will be useful. Furthermore, the system needs to decide whether to automatically apply the tag, suggest it as a tag, or apply it as a latent tag. An algorithm may be used to rank which tags are most meaningful or likely to be useful and the most appropriate way to apply the tag to the message. Having a rank ordering of candidate tags is also useful for an interface that presents users a short list of suggested tags and if the user selects a tag to apply, which removes that tag from the short list and the next candidate in rank is added to the short list.

Embodiments of the invention may combine content analysis techniques, socially-based tagging, and the incorporation of related tags from other social software systems to produce categorization information which is presented to the user using a combination of means to consume them (automatically applied tags/folders, suggested tags/folders, search keywords). The advantage in this combination over the solutions listed above is that through providing a broader basis for suggestions, if any one dimension is lacking (e.g., not enough content for a good content analysis), the remaining sources may still provide a rich enough basis for suggestions.

Figure 5:
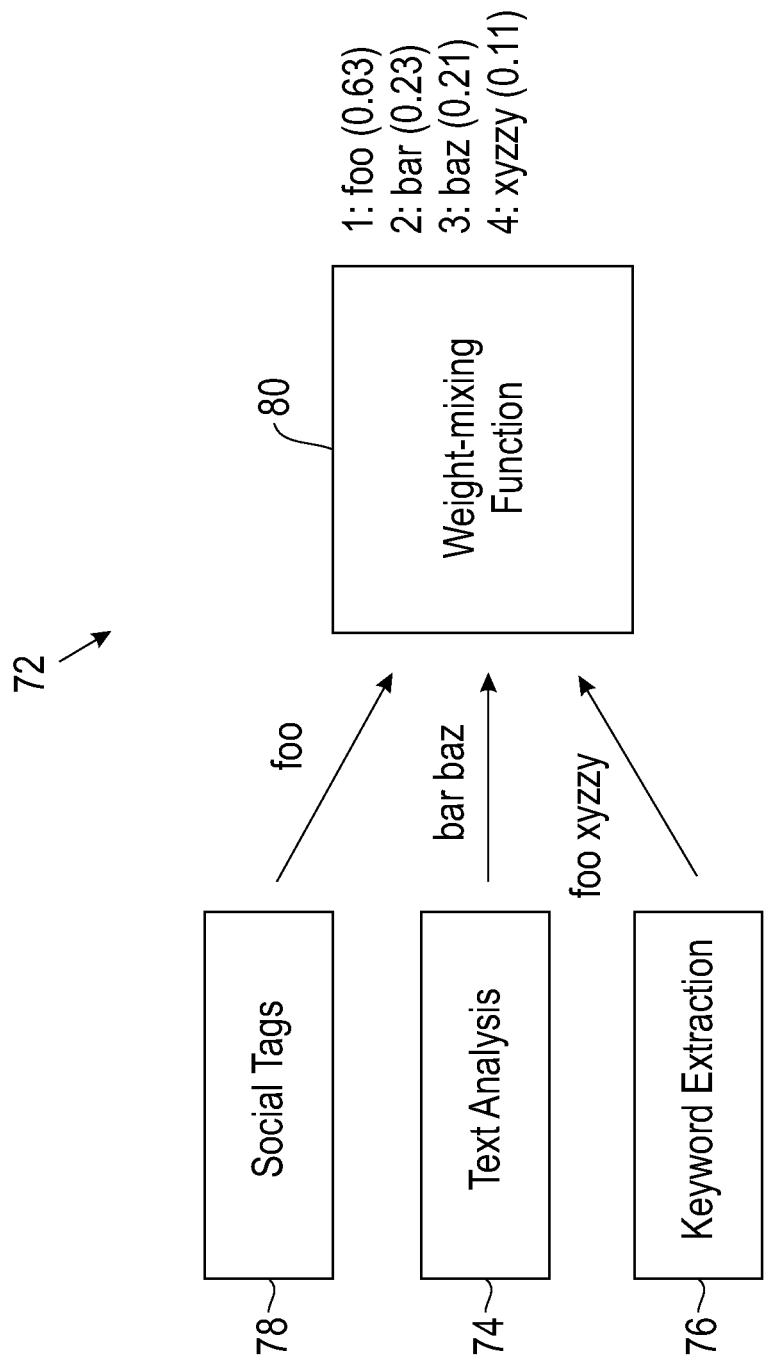
FIG. 5 shows a diagram of a system for augmented tagging in email in accordance with an embodiment of the invention.

FIG. 5 shows a diagram of a system 72 for augmented tagging in email in accordance with an embodiment of the invention. Assume that a new message arrives in a user's inbox. The message may be compared against the corpus of this user's e-mails using a Text Analysis algorithm 74, which produces a keyword set (A), shown as "bar baz" in FIG. 5. As part of the text analysis, a keyword extraction component 76 may use pattern recognition techniques pull out structured data such as URLs, file objects, people's names, etc. that are then used as seeds into other systems to gather social tagging information into a keyword set (B), shown as "foo xyzzy" in FIG. 5 (e.g., a URL is recognized and cross-referenced with del.icio.us to collect tags from the community).

The message may then be checked by the social tags component 78 for social tags, that is, tags that were already applied by other recipients of the message, and these are gathered into a keyword set (C), shown as "foo" in FIG. 5. A weight mixing function component 80 may then use a weight-based mixing algorithm to take as input the three keyword sets (A, B, and C) and aggregate the values into a single set of keywords which may be presented to the user in different forms:

1. As suggestions for tags to be applied to the message, as well as folders where the messages are to be moved. These are shown together with the message when the user opens it.
2. In the form of keywords that are not shown prominently for the users (in fact, they can be hidden altogether) but are used when the user performs a search.
3. Applied automatically in the form of tags, or by taking the action of placing the e-mail in folders matching the keywords (optionally bypassing the inbox altogether).

In order to facilitate the scenario above, the following techniques could be used. A text-classifier algorithm (A) can be run on the emails contents retrieving important keywords or other lexical tokens that can be suggested as tags. These keywords can also be combined with the users' existing and applied tag set to better match its own language. Text-classifying algorithms can also separate a population of data (messages) into categories or "clusters", and this classification can also be used to grab tags that other messages in the same cluster have received to be offered as suggestions. Known solutions like TF-IDF based ones (used by SwiftFile), k-means or others could be used for this approach.

Another family of algorithms can gather socially-applied tags from applications outside of email to content embedded in the email message being analyzed (B). For example, an email with an embedded URL can trigger the search for tags applied in social bookmarking applications like del.icio.us, as each of them provide APIs or protocols to perform searches and retrieve information. This is the first embodiment of the invention as described above.

A person being named (or just being part of the recipients set) can be also queried to a corporate or social directory and the tags that person has received by other users can be retrieved (C). Like other web applications, directory applications offer a variety of protocols to retrieve users' information, including the tags that each user has received. For example, a user that has been tagged with the name of the project he works on would cause messages he sends to have that word as a tag suggestion.

These three categories can be combined too, as for example: embodiments may use the text classification algorithm (A), tags applied from other applications on components of the message (B), and tags applied to people associated with the message (C) create an abstract representation of the message content. That representation could be compared with representations of other messages that have been tagged. By transitivity, tags that other users have applied to similar messages (according to that abstract representation), can be used as suggestions for the incoming message.

Figure 6:
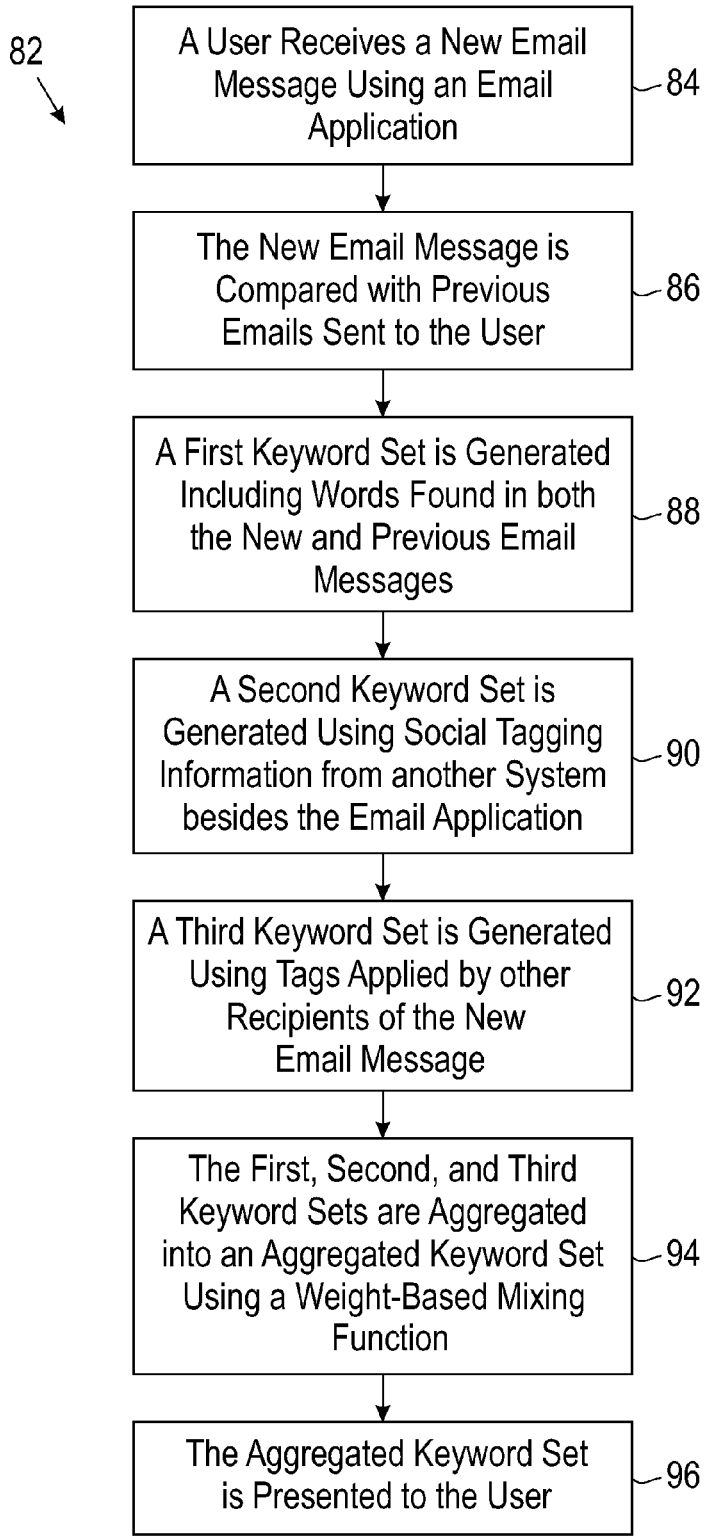
FIG. 6 shows a flowchart of a method of augmented tagging for emails in accordance with an embodiment of the invention.

FIG. 6 shows a flowchart of a method 82 of augmented tagging for emails in accordance with an embodiment of the invention. In step 84, a new email message is received by a user using an email application. The new email message is compared with previous emails sent to the user using a text analysis algorithm, in step 86. In step 88, a first keyword set is generated including words found in both the new and previous email messages. In step 90, a second keyword set is generated using social tagging information from another system besides the email application. In step 92 a third keyword set is generated using tags applied by other recipients of the new email message. In step 94, the first, second, and third keyword sets are aggregated into an aggregated keyword set using a weight-based mixing function. The aggregated keyword set is presented to the user, in step 96.

As can be seen from the above disclosure, embodiments of the invention provide techniques for augmented and cross-service tagging. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction running system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction running system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
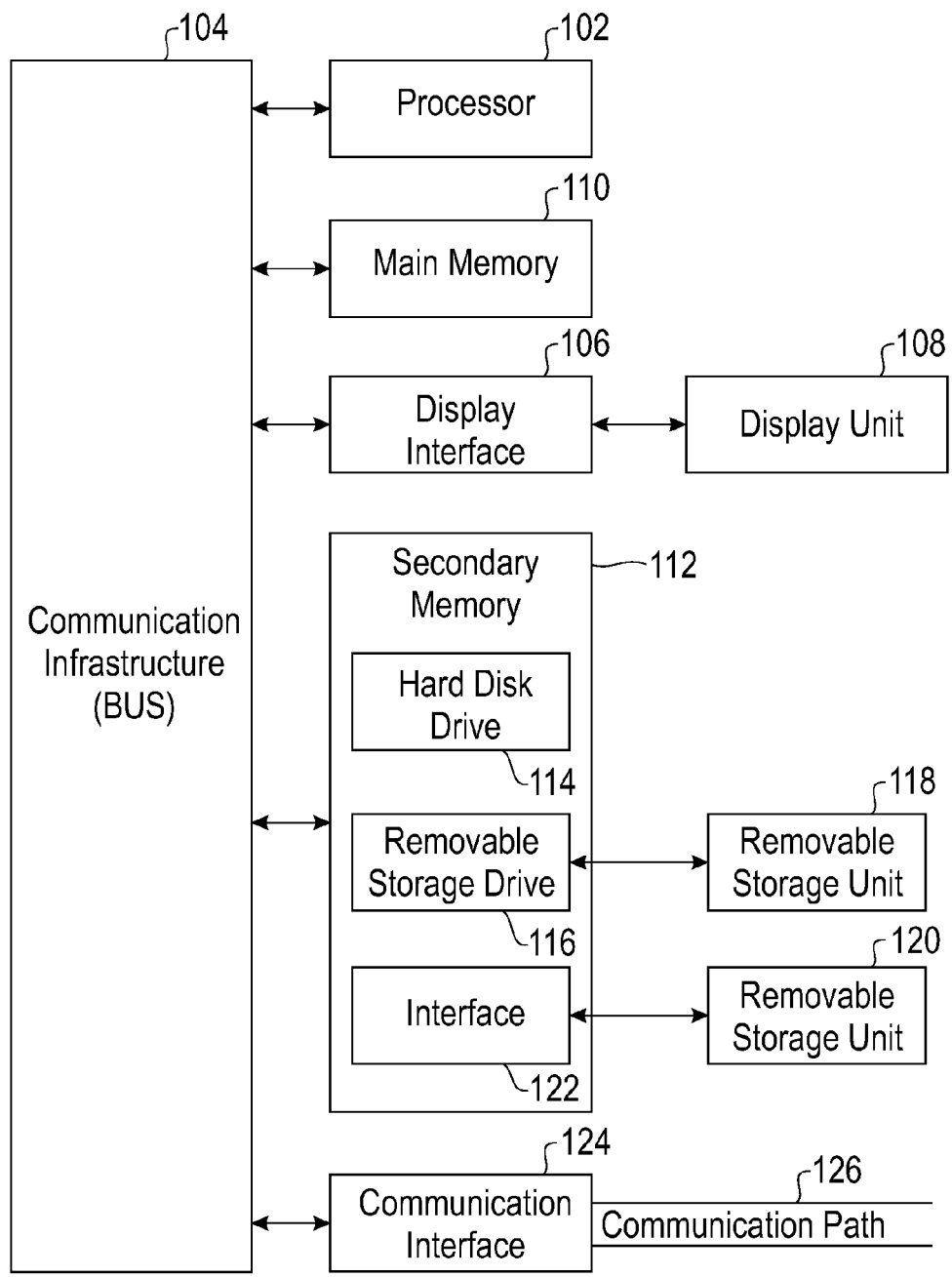
FIG. 7 shows a high level block diagram of an information processing system useful for implementing one embodiment of the present invention.

FIG. 7 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
creating, by a computer system including one or more processors executing a cross-service tagging mashup application, connections to multiple applications, each application having multiple entities;
determining, by the computer system, relationships between said entities within a single application and between entities across multiple applications;
associating, by the computer system, a tag with a selected one of said entities in a first one of said multiple applications;
identifying, by the computer system, based on said determined relationships, entities in other applications besides said first application that are related to said selected entity, the first one of said applications including at least one of an email application, a blogging application and a website-bookmarking application, and said other applications include at least a different one of the email application, the blogging application and the website-bookmarking application; and
propagating, by the computer system, said tag across the multiple applications by associating said tag with said identified entities in said other applications, the propagating said tag including generating the tag in the other applications such that displaying one of the identified entities in the multiple applications results in displaying the tag together with the one of the identified entities.

2. The method according to claim 1 wherein said determining relationships comprises applying a text analysis process.

3. The method according to claim 1 wherein said determining relationships comprises identifying entities across multiple applications that include a common URL.

4. The method according to claim 1 wherein said determining relationships comprises identifying entities across multiple applications that are part of a common email thread.

5. The method according to claim 1 wherein said determining relationships comprises identifying entities across multiple applications that are part of a common activity tree.

6. The method according to claim 1 wherein said determining relationships comprises identifying entities across multiple applications that have an element of structured information in common.

7. The method according to claim 6 wherein said structured information comprises a referenced person.

8. The method according to claim 6 wherein said structured information comprises file objects.

9. The method of claim 1, wherein the selected one of the said entities is an email message, and
propagating said tag across multiple applications by associating said tag with said identified entities in said other applications includes applying said tag to said entities pointed to by the email message.

10. The method of claim 1, wherein the first one of said applications is an email application,
said other applications include at least one of a blogging application and a bookmarking application,
propagating said tag across the multiple applications includes displaying on the at least one of the blogging application and the bookmarking application an indicator that said tag has been applied to the email message without providing to a user of the blogging application or the bookmarking application access to an email message to which said tag has been applied.

11. A system comprising:
one or more computers running a plurality of applications;
a first computer of the one or more computers running a cross-service tagging mashup application, the cross-service tagging mashup application connected to the plurality of applications;
a relationship discovery component of the first computer for discovering relationships between entities within individual applications and between entities across multiple applications;
a tag initiation component of the first computer for initiating tags; and
a tag propagation component of the first computer for propagating tags across multiple applications based on relationships discovered by said relationship discovery component, the tag propagation component configured to propagate tags from at least one of an email application, a blogging application and a website-bookmarking application to a different one of the email application, the blogging application and the website-bookmarking application such that initiating tags to associated the tags with the entities in one of the multiple applications results in displaying the tags together with the entities in the other of the multiple applications.

12. The system according to claim 11 wherein said relationship discovery component associates said tag with a selected entity in a first one of said applications and identifies entities in other applications besides said first application that are related to said selected entity, based on said discovered relationships.

13. The system according to claim 11 wherein said relationship discovery component applies a text analysis process.

14. The system according to claim 11 wherein said relationship discovery component identifies entities across multiple applications that include a common URL.

15. A method comprising:
receiving, by a computer system running a tagging mashup application, a new email message sent to a user using an email application;
comparing said new email message with previous emails sent to said user;
generating, by the computer system, a keyword set of related words, including words found in both said new and previous email messages;
presenting, by the computer system, said keyword set to said user to generate a tag; and
propagating, by the computer system, said tag across multiple applications by associating said tag with identified entities in applications other than the email application such that displaying one of the identified entities in the applications other than the email application results in displaying the tag together with the one of the identified entities, the identified entities corresponding to entities pointed to by content in the new email message.

16. The method according to claim 15 wherein said keyword set uses social tagging information from another system besides said email application.

17. The method according to claim 16 wherein said generating a keyword set comprises aggregating a plurality of keyword sets using a weight based mixing function into an aggregated keyword set, and wherein said presenting comprises presenting said aggregated keyword set to said user.

18. The method according to claim 17 wherein said presenting said aggregated keyword set comprises:
suggesting tags to be applied to said new email message, said applied tags being derived from said aggregated keyword set; and displaying said applied tags to said user with said new email message is opened.

19. The method according to claim 17 wherein said presenting said aggregated keyword set further comprises using said aggregated keywords when said user performs a search.

20. The method according to claim 17 wherein said presenting said aggregated keyword set further comprises applying tags to said new email message, said applied tags being derived from said aggregated keyword set.

21. The method according to claim 17 wherein said presenting said aggregated keyword set further comprises placing said new email in folders matching words in said aggregated keyword set.

22. A computer program product for cross-service tagging, said computer program product comprising:

a non-transitory computer readable storage medium having computer readable program code embodied therewith, said computer readable program code comprising:

computer readable program code configured to:

create connections to multiple applications, each application having multiple entities;

determine relationships between said entities within a single application and between entities across multiple applications, the multiple applications including at least an email application, a blogging application and a website-bookmarking application;

associate a tag with a selected one of said entities in a first one of said multiple applications;

identify entities in other applications besides said first application that are related to said selected entity, based on said determined relationships; and propagate said tag across multiple applications by associating said tag with said identified entities in said other applications, such that displaying said identified entities in said other applications includes displaying said tag together with said identified entities in said other applications.

* * * * *